Sept. 25, 1923.
W. A. DARRAH
PROCESS OF PREPARING DOUGH
Filed Feb. 7, 1921
1,468,775
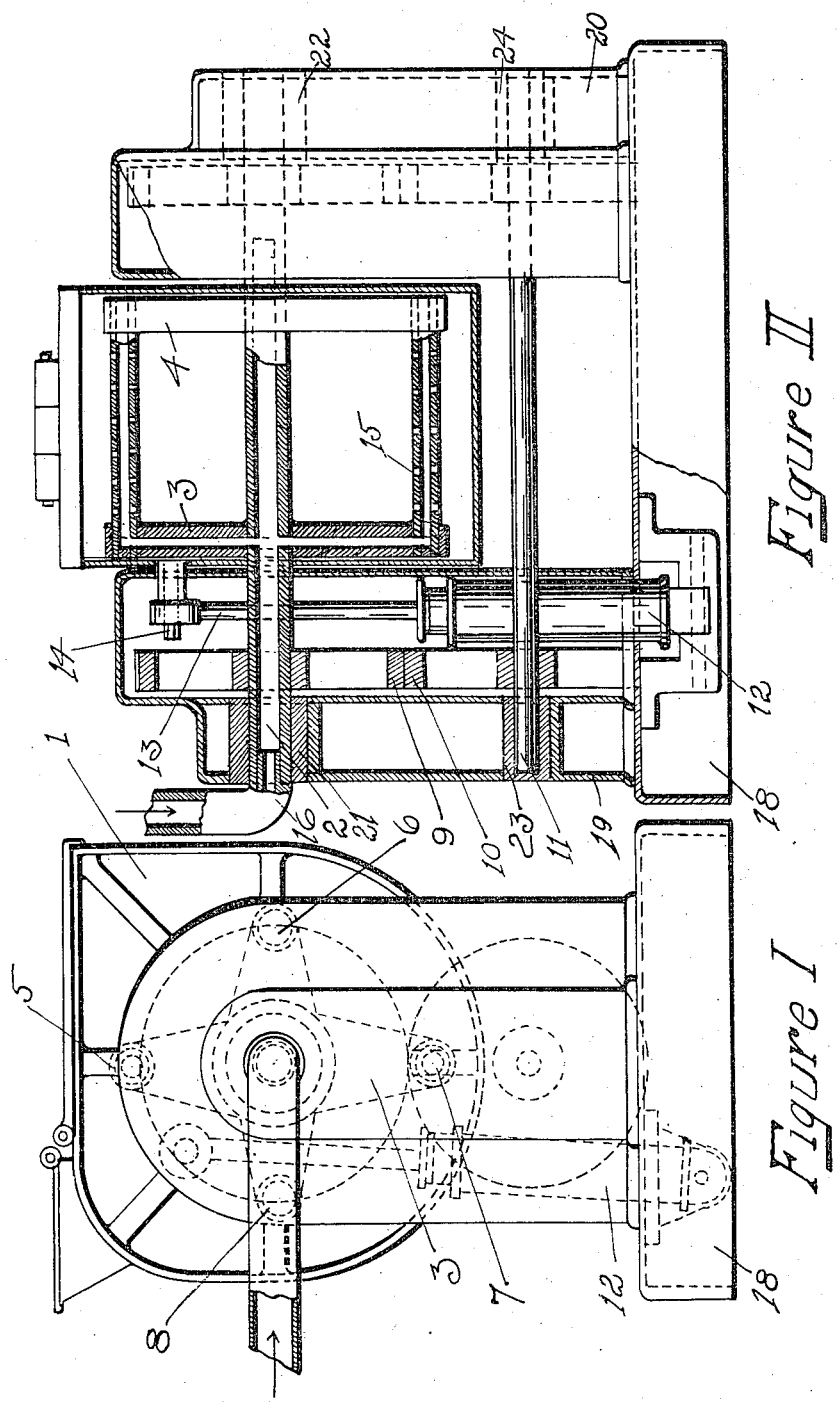

Patented Sept. 25, 1923.

1,468,775

UNITED STATES PATENT OFFICE.

WILLIAM A. DARRAH, OF CHICAGO, ILLINOIS, ASSIGNOR TO THE EKCO ENGINEERING COMPANY, OF CHICAGO, ILLINOIS.

PROCESS OF PREPARING DOUGH.

Application filed February 7, 1921. Serial No. 443,240½.

*To all whom it may concern:*

Be it known that I, WILLIAM A. DARRAH, a citizen of the United States, residing at Chicago, in the county of Cook and State of Illinois, have invented a new and useful Improvement in Processes of Preparing Dough, of which the following is the specification.

This invention relates to methods of preparing and mixing materials, particularly to compositions which require the admixture of solid powders and liquids.

This invention more particularly applies to the preparation of doughs for bread, cake and similar purposes, although it should be understood that it may be applied with equal advantage to the preparation of such doughs as are used in the manufacture of various carbon products, clays used in ceramic work, paper making, and various other arts.

The description and methods which are outlined here will be illustrated in this specific case for the manufacture of dough for bread, but it will be obvious that by merely changing the ingredients and making simple modifications in the equipment, the process will be applicable to many other cases.

In most instances where it is desirable to mix a solid with a liquid, if the solid is in a powdered form, some little time is required unless a large excess of liquid is added. In current practice in the manufacture of dough, it is desirable to add as much liquid (water) as possible in order to hydrate the flour and secure a well mixed loaf having good keeping properties, and sufficient moisture to be palatable.

On the other hand, the addition of an excess of water to the dough during the mixing period has the result of producing a pasty material which is only handled with great difficulty in the dividing and molding machines, and which frequently does not retain sufficient carbon dioxid from the fermentation process to rise properly and produce a good loaf.

Another consideration which enters into the mixing of dough is a thorough and uniform distribution of the water. It is well known that flour absorbs moisture forming what is probably a chemical compound, known technically as hydrated flour. If the flour is not thoroughly hydrated during the mixing period, it will in subsequent operations and on standing before and after the bread is baked absorb a certain amount of moisture from the balance of the loaf, thus causing it to become dry and hard having the characteristics known as stale bread.

It has been found that when the flour is thoroughly hydrated during the mixing period, the additional water contained in the bread is not absorbed on standing and the bread does not become stale in anywhere nearly the same period.

In addition to the water employed in hydrating the flour, water is also combined with the dough in the form of colloidal solutions with gluten and other ingredients. There is also probably some free water which is absorbed between the particles of the solids in much the same way that a pile of sand will hold water within its interstices.

In present commercial practice, it is necessary to work carefully between the limitations mentioned above. If an excess of water is added, the dough becomes of such consistency that it is only with difficulty handled by the machinery of an ordinary commercial plant, while if insufficient water is added, a poor quality of bread is produced, at an increased cost and at the sacrifice of keeping qualities.

One of the objects of this invention is to overcome the difficulties mentioned above and to allow a ready commercial production of dough having the maximum amount of moisture present and properly distributed throughout the entire mass, without encountering the difficulties of too thin or too weak a dough.

Other objects will be apparent from the description of this invention which follows.

I have found that if an excess of water is added with the ingredients at the initial mixing of the dough that when properly manipulated thorough hydration takes place. If, under these conditions, a portion of the excess moisture is removed by continual stretching and exposing new surfaces of the dough in the presence of a rapidly moving stream of unsaturated air, the product is thoroughly hydrated having certain very desirable characteristics.

I have found that a surprisingly small additional amount of water is necessary in order to produce the above results. For example, if 70 per cent (by weight) of the dough consists of water and 5 per cent is removed, under the conditions outlined above, the resultant change from a thin, unworkable dough to a stiff, strong dough is very marked. It should be understood that the removal of the excess water in order to produce the desired result must be uniform throughout the entire mass of the dough and must not be confined to a single portion of it. In other words, by stretching and shredding the dough while it is exposed to a large number of streams of unsaturated air, the best results seem to be obtained, and it would appear that the resultant product is composed of particles of dough containing a maximum amount of water internally with the stronger surfaces containing a lesser amount of water. In other words, it would appear as if the structure of such a dough was somewhat cellular.

I have also found that in some cases, the action described above may be accelerated and its results made more pronounced by starting initially with a dough which is faintly alkaline. It should be understood, of course, that the degree of alkalinity is extremely small, merely being sufficient to act as a dispersing agent to the colloids of the dough. I have found that under these conditions, the mass is much more liquid with a given quantity of water than when it is neutral or slightly acid. However, it is difficult to properly handle a dough of this nature with the commercial bread making machinery, so that it is desirable for this and other reasons to neutralize the alkaline characteristics of the dough as working proceeds. This may be done in a great many ways as, for example, by introducing such gases as carbon dioxid, hydrochloric acid, etc., in minute quantities into the air which passes over the stretched surface of the dough. I have found that diluted aqua ammonia is well suited as a dispersing agent. While the mildly alkaline solution has a tendency to retard the growth and development of the yeast, it will not otherwise diversely affect the yeast, and its slight growth and development will frequently produce enough carbon dioxid to neutralize the original alkalinity. It will, therefore, be evident that the original alkalinity may or may not be neutralized by the addition of outside acids depending upon many variable factors.

In order to best carry out the process which has been described above, it is advisable to employ a special mixing equipment, a typical form of which is shown in the drawing.

Referring to the drawing, Fig. 1 illustrates an end elevation of this form of mixer, while Fig. 2 shows a side elevation partly in section of the same mixer.

Referring to Fig. 1, 1 indicates a drum or container in which shaft 2 rotates. Shaft 2 carries spiders 3 and 4 which support beater arms 5, 6, 7 and 8 which serve to mix the ingredients.

Shaft 2 may be rotated in any desirable manner as, for example, by gears 9 meshing with pinions 10 on countershaft 11 which may be turned by any suitable device.

12 indicates a hydraulic cylinder, piston rod 13 of which is connected by pin 14 to container 1 and serves to tilt container 1 for removing its contents when the mixture is completed. Shaft 2 and spiders 3 and 4 have hollow connecting passages leading to beater arms 5 and 7 which are provided with longitudinal passageways extending the length of said arms and with vent holes 15 for allowing the air and gases to escape from said arms. A stuffing box 16 serves to supply air from a compressor or any other desired source to shaft 2 and thence to arms 5 and 7 and the vents referred to above.

In practice it is desirable to have air at at least 5 pound pressure supplied to the system and a much greater pressure is frequently an advantage.

Base 18 carries supports 19 and 20 on which bearings 21, 22, 23 and 24 support the shaft 2 and countershaft 11 referred to above.

From the above description, it will be apparent that as the beater arms 5 and 6 rotate, they will distribute innumerable bubbles of air throughout the mass of the mixture; on the initial mixing, the water and flour will first assume a condition somewhat similar to suds formed from soap, but as the mixing process continues, the dough will gradually become stiffer retaining, however, a considerable amount of the air thus distributed throughout its mass.

This method of mixing not only materially improves the uniformity of the dough, but serves to thoroughly aerate the yeast which increases its activity and reduces the time required for fermentation.

Another marked development of this process is the decided cooling effect, as a result of the evaporation of a portion of the water added to the dough. It will be evident that the evaporation of a pound of water will absorb from 1,000 to 1,200 British thermal units, depending upon local conditions. Therefore, the evaporation of a relatively few pounds of water will result in maintaining the temperature of the dough at practically any desired temperature limited only by the relative temperatures of the wet and dry bulb thermometer. The advantages of cooling the dough by this method are a much more uniform control of the temperature due to the excellent distribution of the air currents and, therefore, of the heat absorption. This is in distinct contrast to the cooling effect of a blast of air directed from one point only upon the dough. Under these conditions, the air has the effect of cooling adjacent portions of the dough excessively while other portions are only inadequately cooled resulting in considerable temperature differences throughout the mass of the dough. Obviously these radical temperature differences have a marked effect upon the rate of development of the yeast in different portions of the dough and are responsible for the irregularities which are too frequently found in commercial bakeries.

It will be evident that the process which constitutes my invention may be carried out to better advantage by the use of refrigerated air instead of air at ordinary room temperature. It may thus be advisable, particularly in the summer, to draw the air from the cold storage room or through a cooling device. It will also be apparent that it is of advantage to the carrying out of this process to use air which has had a portion of its moisture removed as it will thereby be possible to materially increase the rate of evaporation thus proportionately increasing the cooling effect.

Having now fully described my invention what I claim as new and wish to secure by Letters Patent in the United States is as follows:

1. In the process of making dough the step of adding much more water than is required in the finished product, and evaporating out the excess.

2. The method of treating dough which consists in mixing the ingredients in an excess of water and passing unsaturated gas through the mixture to remove the excess of water.

3. The process of cooling dough by mixing said dough with an excess of water in the presence of a stream of air, said stream of air entering said dough from a source movable through said dough.

4. The process of mixing dough which consists in adding an excess of water then working the dough with sufficient intensity to generate considerable heat and simultaneously absorb the heat as produced at substantially the point said heat is produced, by forcing air from a movable source through the dough.

5. In the process of mixing dough the step of shredding the dough mass and forcing small streams of cold air into the shredded portion in the form of bubbles.

6. In the process of mixing dough the step which consists in forcing cold air into the dough at the points that heat is generated due to the mixing.

February 4, 1921.

WILLIAM A. DARRAH.